United States Patent [19]

Iwamura

[11] Patent Number: 5,419,383

[45] Date of Patent: May 30, 1995

[54] PNEUMATIC TIRE INCLUDING HYBRID BELT CORD

[75] Inventor: Wako Iwamura, Kobe, Japan

[73] Assignee: Sumitomo Rubber Industries, Ltd., Kobe, Japan

[21] Appl. No.: 972,633

[22] Filed: Nov. 6, 1992

[30] Foreign Application Priority Data

Nov. 15, 1991 [JP] Japan .................................. 3-328190

[51] Int. Cl.⁶ .................. B60C 9/22; B60C 11/00; B60C 15/06; D02G 3/48
[52] U.S. Cl. ................................... 152/209 R; 57/238; 57/244; 57/902; 152/527; 152/531; 152/533; 152/536; 152/546; 152/547
[58] Field of Search ................ 152/527, 451, 531, 533, 152/536, 209 R, 546, 547; 57/902, 238, 239, 244, 245

[56] References Cited

U.S. PATENT DOCUMENTS

| | | |
|---|---|---|
| 3,857,229 | 12/1974 | Marzocchi . |
| 4,155,394 | 5/1979 | Shepherd et al. .................... 152/527 |
| 4,311,179 | 1/1982 | Hayakawa et al. .............. 152/209 R |
| 4,333,507 | 6/1982 | Schmit et al. ........................ 152/527 |
| 4,617,976 | 10/1986 | Kawajiri .......................... 152/209 R |
| 4,706,724 | 11/1987 | Ohkuni et al. .................. 152/527 X |
| 4,832,101 | 5/1989 | Welter . |

FOREIGN PATENT DOCUMENTS

| | | |
|---|---|---|
| 0335588 | 10/1989 | European Pat. Off. ............ 152/527 |
| 0360588 | 3/1990 | European Pat. Off. . |
| 4-2832 | 1/1992 | Japan ..................................... 57/902 |
| 1487426 | 9/1977 | United Kingdom ................ 152/533 |
| 2003525 | 3/1979 | United Kingdom . |

*Primary Examiner*—Adrienne Johnstone

[57] ABSTRACT

A pneumatic tire, which comprises a tread portion (2) having a pair of tread edges, a pair of axially spaced bead portions (4), a pair of sidewall portions (3) extending between the tread edges and the bead portions (4), a bead core (5) disposed in each of the bead portions (4), a carcass (6) extending between the bead portions and turned up around the bead cores, a rubber tread disposed radially outside the crown portion of the carcass defining the tread portion, and a belt (7) made of at least one spirally wound belt cord (11) disposed between the carcass and the rubber tread, the belt cord (11) comprising a higher modulus strand (13A) and a lower modulus strand (14A) which are twisted together, the higher modulus strand (13A) made of at least one continuous organic filament (13) having a higher elastic modulus, the lower modulus strand (14A) made of at least one continuous organic filament (14) having a lower elastic modulus, and in a unit length of the belt cord, the length (L1) of the higher modulus filament (13) is in the range of 104 to 124% of the length (L2) of the lower modulus filament (14), each measured along the filament in an unloaded state.

8 Claims, 3 Drawing Sheets

PNEUMATIC TIRE INCLUDING HYBRID BELT CORD

The present invention relates to a pneumatic tire having an improved belt structure, in which high speed durability is improved and tire weight reduction is achieved.

BACKGROUND OF THE INVENTION

In belted radial tires for high performance cars such as sport cars, a steel belt composed of two plies of steel cords arranged in parallel with each other at an angle of 15 to 30 degrees with respect to the tire equator are hitherto widely employed. Such a steel belt, however, greatly increases the tire weight and lowers the fuel consumption performance, when constructed to endure against high speed running, for example over 200 km/h. In order to reduce a tire weight by using light material cords in the belt, the present inventor experimentally made and tested tires, wherein the belt is formed by spirally winding a high modulus aromatic polyamide fiber cord on the carcass. As a result, the inventor found that when such a high modulus single material cord is used in a spiral belt structure, the tread rigidity is excessively increased and steering stability and ride comfort are lost. Further, during a tire vulcanizing process through which the inside of the tire is pressurized by an inflated tube, the belt elongation becomes insufficient to press the tire against the mold, and as a result, sometimes the molding becomes incomplete, and undesirable stress and/or strain reside in the belt, tread rubber and so on.

SUMMARY OF THE INVENTION

It is therefore, an object of the present invention to provide a pneumatic tire, in which the high speed durability is improved and at the same time tire weight reduction is achieved without deteriorating the steering stability and ride comfort.

According to one aspect of the present invention, a pneumatic tire comprises
a tread portion having a pair of tread edges,
a pair of axially spaced bead portions,
a pair of sidewall portions extending between the tread edges and the bead portions,
a bead core disposed in each of the bead portions,
a carcass extending between the bead portions and turned up around the bead cores,
a rubber tread disposed radially outside the crown portion of the carcass defining the tread portion, and
a belt made of at least one spirally wound belt cord disposed between the carcass and the rubber tread, wherein
the belt cord comprises a higher modulus strand and a lower modulus strand which are twisted together,
the higher modulus strand made of at least one continuous organic filament having a higher elastic modulus,
the lower modulus strand made of at least one continuous organic filament having a lower elastic modulus, and
in a unit length of the belt cord, the length of the higher modulus filament being in the range of 104 to 124% of the length of the lower modulus filament, each measured along the filament in an unloaded state.

BRIEF DESCRIPTION OF THE DRAWINGS

An embodiment of the present invention will now be described in detail in conjunction with the accompanying drawings, in which.

DETAILED DESCRIPTION OF THE INVENTION

Figure 1:
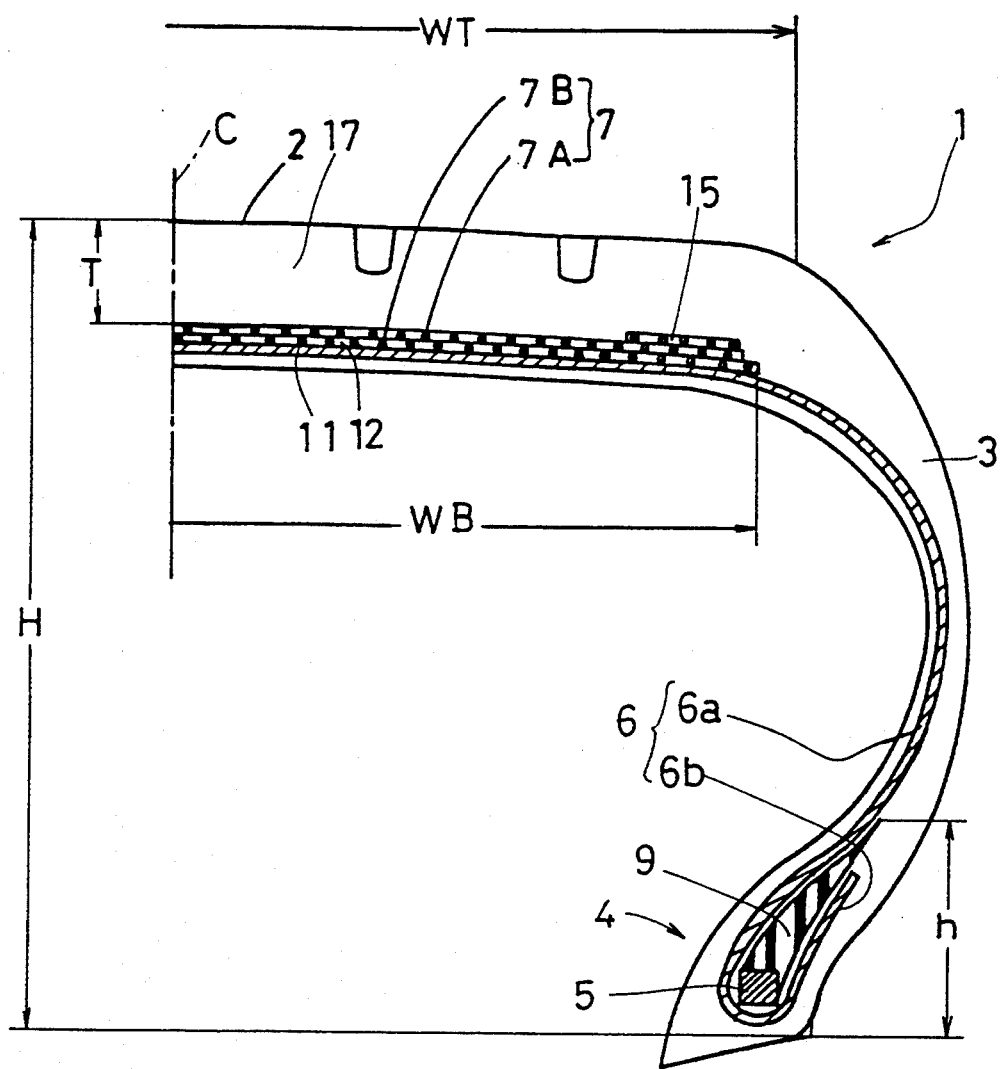
FIG. 1 is a cross sectional view of a passenger car tire according to the present invention.

In the figures, pneumatic tire 1 has a tread portion 2, a pair of axially spaced bead portions 4, and a pair of sidewall portions 3 extending between the tread edges and the bead portions. The tire 1 comprises a pair of bead cores 5, one disposed in each of the bead portions 4, a carcass 6 extending between the bead portions 4, and belts 7 disposed radially outside the carcass 6 and inside a rubber tread 17.

The carcass 6 comprises at least one ply, in this example one ply, of cords arranged radially at an angle of 85 to 90 degrees with respect to the tire equator C. The carcass ply extends between the bead portions 4 through the sidewall portions 3 and the tread portion 2 and turned up around the bead cores 5 from the axially inside to the outside thereof to form two turned up portions 6b and one main portion 6a therebetween.

For the carcass cords, organic fiber cords, e.g. nylon, rayon, polyester and the like are used.

Each of the bead portions 4 is provided between the carcass main portion 6a and each turned up portion 6b with a rubber bead apex 9 extending radially outwardly from the bead core 5.

In this embodiment, the belts 7 include a radially inner wide belt 7B disposed on the carcass, a radially outer wide belt 7A disposed on the inner belt 7B, and a pair of axially spaced narrow edge band belts 15, one disposed on each edge part of the radially outermost wide belt 7A.

Figure 2:
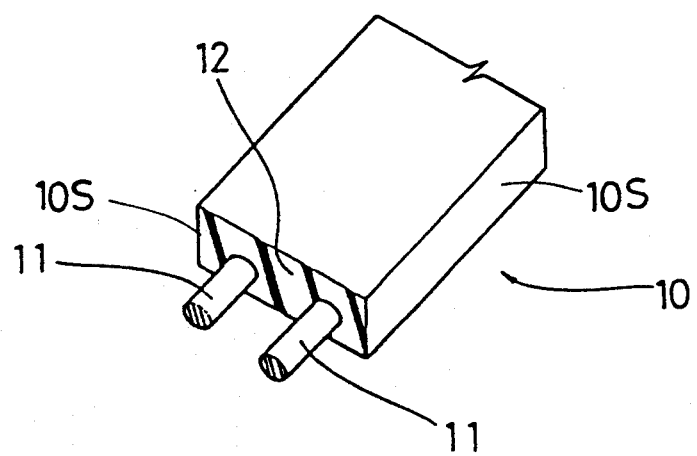
FIG. 2 is a perspective view of a reinforcing strip used to form the belt.

Each belt 7A, 7B, 15 is made of belt cords 11 wound spirally so that the windings of the belt cords 11 are laid at a substantially zero angle with respect to the tire equator C. For example, each belt is formed by spirally winding a reinforcing strip 10 of rubber 12 in which one cord or a plurality of parallel cords 11 are embedded as shown in FIG.2. This rubber 12 forms the topping rubber for the belt cords. The strip 10 is wound compactly, that is, contacting the side faces 10S with each other to keep the winding pitches constant. However, the pitches can be varied by providing variable spaces between the adjacent windings.

The maximum width WB of the wide belts in the tire axial direction is set to be not less than 0.85 times the tread width WT. If the width is less than 0.85 times WT, the rigidity of the tread edge portion or tread shoulder portion decreases and cornering performance is deteriorated.

The above-mentioned belt cord 11 is a hybrid cord made of a higher modulus strand 13A and a lower modulus strand 14A which are twisted together.

For the high modulus strand 13A, high modulus organic filaments 13 having a higher elastic modulus of not less than 1000 kgf/sq.mm, preferably not less than 1500 kgf/sq.mm, for example, aromatic polyamide filaments, aromatic polyester filaments, polyvinylalcohl filaments having a strength of not less than 15 g/d, and the like are used.

For the low modulus strand 14A, low modulus organic filaments 14 having a lower elastic modulus of not more than 700 kgf/sq.mm, preferably not more than 400 kgf/sq.mm, for example, nylon filaments, polyester filaments, vinylon filaments and the like are used.

Figure 3:
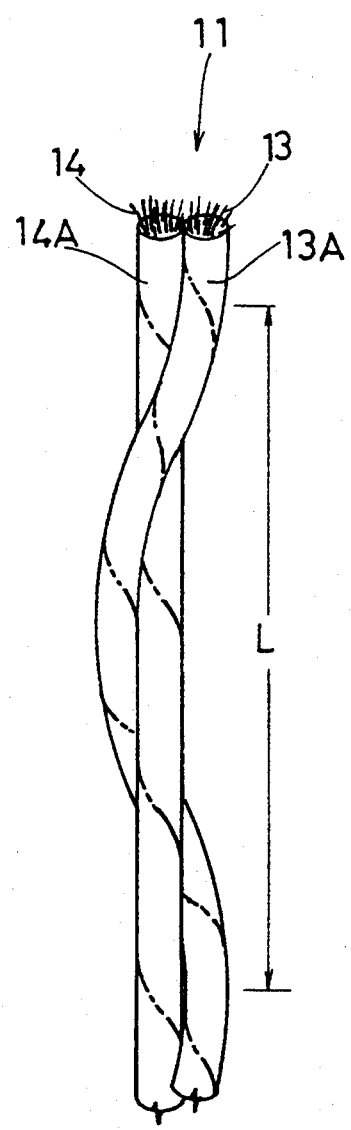
FIG. 3 is a perspective view of the belt cord.

In this embodiment, each strand 13A, 14A is made of a plurality of filaments twisted together as shown in FIG.3. However, the strand (13A and/or 14A) may be made of a single filament.

Figure 4:
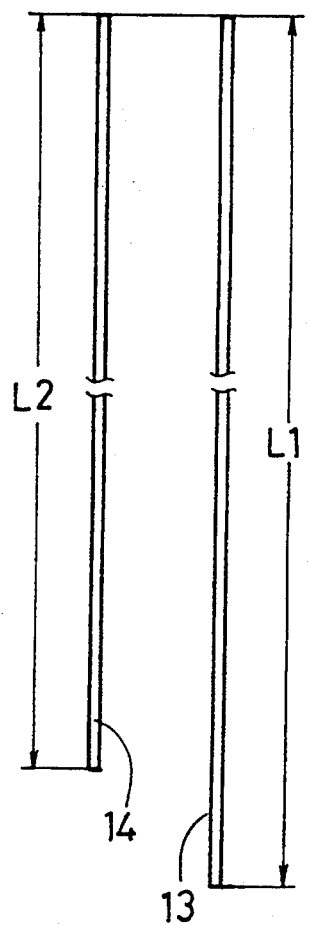
FIG. 4 is a diagram explaining the length difference between the high modulus filament and the low modulus filament.

In a unit length L of the belt cord 11, the length L1 of the high modulus filament 13 is 104 to 124% of the length L2 of the low modulus filament 14, each measured along the filament under an unloaded state or unelongated state as shown in FIG.4. Preferably, the length L1 is 109 to 119% of the length L2.

In order to provide the above-mentioned different lengths L1 and L2, in this embodiment, the cable twist number or multiplier of the low modulus strand 14A is differed from that of the high modulus strand 13A, while the strand-twist number or multiplier of the low modulus strand 14A is set to be equal to that of the high modulus strand 13A. It is also possible, in the present invention, to differ the filament length L1 from the filament length L2 by 1) setting the cable twist number of the strand 13A equal to that of the strand 14A, and setting the strand twist number of the strand 13A more than that of the strand 14A, or
2) setting both the strand twist number and cable twist number of the strand 13A more than those of the strand 14A.

As the low modulus filaments 14 are shorter than the high modulus filaments 13, the belt cords are easily elongated until the high modulus filaments are loaded with most of the load, and thereby tire vulcanization can be improved. In the finished tire, on the other hand, as the belt cords are in an elongated state exhibiting a high modulus, the tread portion can be provided with a tight hooping effect and a high resistance against a great deformation of the tread portion. Therefore, steering stability and high speed durability are greatly improved with maintaining ride comfort.

If the filament length L1 is less than 104% of the length L2, the vulcanization is not improved, and ride comfort and steering stability are impaired. If the length L1 is more than 124% of the length L2, high speed durability decreases.

In the tests, the inventor also found that a belt made of spirally wound hybrid cords generally has a tendency to decrease the cornering power in comparison with the conventional belt structure. In this embodiment, therefore, in order to avoid such a decrease and to obtain an improved cornering power, the quotient T/A (mm/degree) of the rubber thickness T (mm) of the rubber tread 17 measured at the tire equator C from the tread surface to the outer surface of the radially outermost belt 7A divided by the JIS A hardness A (degree) of the tread rubber 17 is set to be not more than 0.20 mm/degree. Further, the tire 1 is provided with a single ply carcass made of cords having a cord modulus lower than that of a 1500d/2 polyester fiber cord, and the JIS A hardness of the bead apexes 9 is set to be not more than 96 degrees, and further the height (h) of the radially outer edges of the bead apexes 9 measured from the bead base line is set to be not more than 0.4 times the tire section height H, because such arrangement is effective in decreasing the tire weight, improving fuel consumption performance, and balancing tire rigidity of a tire with a relatively low cornering power.

As explained above, in the tire according to the present invention, as the organic fiber cord belt is used instead of steel belts, the tire weight can be greatly decreased. Further, as the belt cord is hybrid of the low modulus strand and low modulus strand of which lengths are specifically defined, a proper elongation is obtained in the tire vulcanizing process, and thereby the vulcanization can be improved. Furthermore, as the bending rigidity of the belt is not excessively increased in contrast with the conventional steel belt, ride comfort and steering stability are obtained at the same time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A pneumatic tire comprising
   a tread portion (2) having a pair of tread edges,
   a pair of axially spaced bead portions (4),
   a pair of sidewall portions (3) extending between the tread edges and the bead portions (4),
   a bead core (5) disposed in each of the bead portions (4),
   a carcass (6) extending between the bead portions and turned up around the bead cores,
   a rubber tread disposed radially outside the crown portion of the carcass defining the tread portion, and
   a belt (7) made of at least one spirally wound belt cord (11) disposed between the carcass and the rubber tread,
   said belt cord (11) comprising a higher modulus strand (13A) and a lower modulus strand (14A) which are twisted together,
   said higher modulus strand (13A) consisting of one continuous organic filament (13) having a higher elastic modulus,
   said lower modulus strand (14A) consisting of one continuous organic filament (14) having a lower elastic modulus, and
   in a unit length of said belt cord, the length (L1) of the higher modulus filament (13) being in the range of 104 to 124% of the length (L2) of the lower modulus filament (14), each measured along the filament in an unloaded state.

2. The pneumatic tire according to claim 1, wherein said length (L1) of the higher modulus filament (13) is in the range of 109 to 119% of said length (L2) of the lower modulus filament (14).

3. The pneumatic tire according to claim 1, wherein the strand-twist number of the lower modulus strand is equal to that of the higher modulus strand, and the cable twist number of the lower modulus strand is differed from that of the higher modulus strand.

4. The pneumatic tire according to claim 1, wherein the strand-twist number of the lower modulus strand is differed from that of the higher modulus strand, and the cable twist number of the lower modulus strand is equal to the higher modulus strand.

5. The pneumatic tire according to claim 1, wherein both the strand twist number and cable twist number of the higher modulus strand are larger than those of the lower modulus strand.

6. The pneumatic tire according to claim 1, wherein the higher modulus organic filament has an elastic modulus of not less than 1000 kgf/sq.mm, and the lower modulus organic filament has an elastic modulus of not more than 700 kgf/sq.mm.

7. The pneumatic tire according to claim 1, wherein the quotient T/A (mm/degree) of the rubber thickness T (mm) of the rubber tread measured from the tread surface to the outer surface of the radially outermost belt (7A) divided by the JIS A hardness A (degree) of the tread rubber is not more than 0.20 mm/degree.

8. The pneumatic tire according to claim 1, wherein each said bead portion (4) is provided with a rubber bead apex (9) having a JIS A hardness of not more than 96 degrees, said bead apex (9) extending radially outwardly from the bead core (5) so as to have a radially outer edge positioned at a height (h) of not more than 0.4 times the tire section height (H), each measured from the bead base line.

* * * * *